Figure 1:
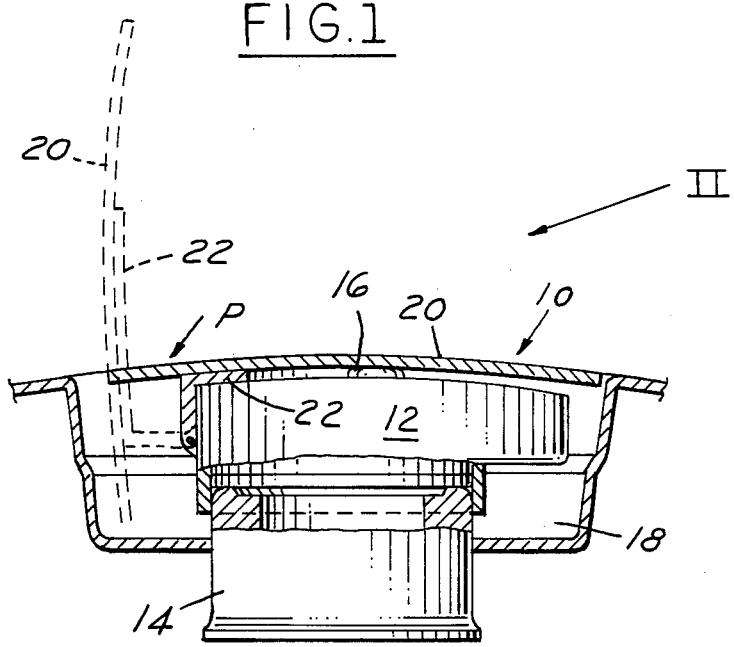

United States Patent [19]

Pardy

[11] Patent Number: 4,784,423

[45] Date of Patent: Nov. 15, 1988

[54] FILLER CAP

[75] Inventor: Ronald Pardy, Tiptree, United Kingdom

[73] Assignee: Ford Motor Company, Dearborn, Mich.

[21] Appl. No.: 6,650

[22] PCT Filed: Aug. 18, 1986

[86] PCT No.: PCT/GB86/00489

§ 371 Date: Nov. 6, 1986

§ 102(e) Date: Nov. 6, 1986

[87] PCT Pub. No.: WO87/01340

PCT Pub. Date: Mar. 12, 1987

[30] Foreign Application Priority Data

Aug. 28, 1985 [GB] United Kingdom ............... 8521398

[51] Int. Cl.[4] .................................. B65D 41/04
[52] U.S. Cl. ......................... 296/97.22; 220/86 R
[58] Field of Search ............. 296/1 C; 220/86 R, 256

[56] References Cited

U.S. PATENT DOCUMENTS

| 4,027,910 | 6/1977 | Farelli | 296/1 C |
| 4,099,645 | 7/1978 | Muth et al. | 220/86 R |
| 4,142,756 | 3/1979 | Henning et al. | 296/1 C |
| 4,212,318 | 7/1980 | Warmbold | 220/86 R |

Primary Examiner—Robert R. Song
Attorney, Agent, or Firm—Robert E. McCollum; Clifford L. Sadler

[57] ABSTRACT

The invention relates to a filler cap 10 for a fuel tank of a motor vehicle, the mouth of the filler spout 16 of which is arranged in a recess 18 in the vehicle body.

The filler cap 10 comprises a body 12 to fit over the mouth of the filler spout 16, and a lock mechanism 16 rotatable relative to the body 12 for locking the filler cap body 10 to the spout 16. A cover plate 20 hinged on the body 12 is pivotable between a first position in which the cover plate 20 is flush with the vehicle body and covers the fuel spout recess 18, and a second position in which access may be gained to the lock mechanism 16.

2 Claims, 1 Drawing Sheet

FILLER CAP

The present invention relates to a filler cap for the fuel tank of a motor vehicle.

It is known to place the filler cap of a motor vehicle in a recess covered by a hinged panel which is painted to match the remainder of the vehicle body. In this way the appearance of the vehicle is not marred by the filler cap. However, such a construction is relatively costly and for this reason it is only to be found on more expensive vehicles.

The invention seeks to provide a filler cap which can blend in with the vehicle body but can be manufactured with less expense.

According to the invention, there is provided a filler cap for a fuel tank of a motor vehicle the mouth of the filler spout of which is arranged in a recess in the vehicle body, the filler cap comprising a body to fit over the mouth of the filler spout, a lock mechanism rotatable relative to the said body for locking the filler cap body to the spout, and a cover plate hinged on the body, the cover plate being pivotable between a first position in which the cover plate is flush with the vehicle body and covers the fuel spout recess, and a second position in which access may be gained to the lock mechanism.

In the invention, the decorative cover plate which lies flush with the vehicle bodywork and may be painted to match, is pivotably secured to the filler cap rather than to the vehicle body. In this way, the same aesthetic appeal may be obtained but with reduced expense.

Figure 2:
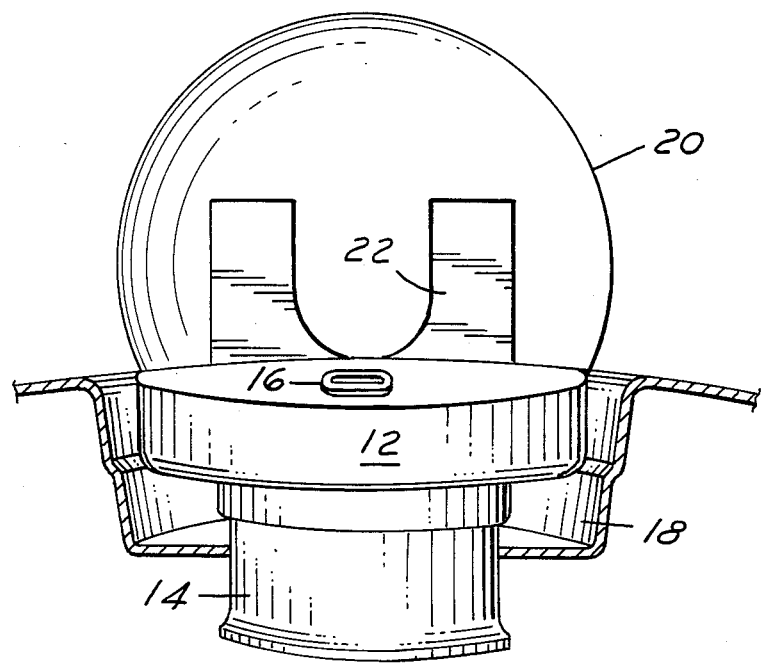

The invention will now be described further, by way of example, with reference to the accompanying drawings, in which:

FIG. 1 is a side view of a filler cap fitted to the fuel spout of a motor vehicle with the cover plate shown in two different positions, and FIG. 2 is a view in the direction of arrow II in FIG. 1 with the cover plate open.

The filler cap 10 in the drawings has a body 12 which fits over a fuel body spout 14. The body is not, as in some known constructions, rotatable relative to the spout 14 but instead has a key operated lock mechanism 16 which can rotate relative to the body 10 to lock the body 12 to the filler spout 14. The body 12 and lock mechanism 16 are conventional and need not therefore be described in detail but it is noted that the orientation of the filler cap 10 relative to the spout 14 and thus relative to the vehicle body is predetermined.

In order to cover the recess 18 in which the spout 14 is located, a decorative cover plate 20 is pivotably mounted on the body 12 by means of a hinge 22. In FIG. 1, the cover plate 20 is shown in dotted lines in its open position and in solid lines in its closed position. It will be seen that in the open position access may be gained to the lock mechanism so that the latter may be rotated by key to permit the filler cap 10 to be removed from the spout 14, complete with the cover plate 20. In the closed position, on the other hand, the cover plate 20 lies flush with the vehicle body to cover the recess 18 and give the same appearance as a vehicle in which a cover is hinged onto the vehicle body for the purpose of disguising the filler spout recess.

The hinge 22 is L shaped and has resilient limbs which snap resiliently over a corner of the body 10. In this way, the resilience of the hinge 22 suffices to keep the cover plate closed, without rattling. To uncover the lock mechanism, pressure is applied by finger to the cover plate 20 at a point P adjacent the hinge 22, the resilience of the hinge now keeping the cover plate 20 away from the lock mechanism 16.

I claim:

1. A filler cap for a fuel tank of a motor vehicle the mouth of the filler spout of which is arranged in a recess in the vehicle body, the filler cap comprising a body to fit over the mouth of the filler spout, a lock mechanism rotatable relative to the said filler cap body for locking the filler cap body to the spout, and a cover plate hinged on the filler cap body, the cover plate being pivotable between a first position in which the cover plate is flush with the vehicle body and covers the recess, and a second position in which access may be gained to the lock mechanism.

2. A filler cap as claimed in claim 1, wherein the hinge is L shaped with resilient limbs.

* * * * *